United States Patent
Nikitidis et al.

(10) Patent No.: US 11,625,464 B2
(45) Date of Patent: Apr. 11, 2023

(54) BIOMETRIC USER AUTHENTICATION

(71) Applicant: Yoti Holding Limited, London (GB)

(72) Inventors: Symeon Nikitidis, London (GB); Jan Kurcius, London (GB); Francisco Angel Garcia Rodriguez, London (GB)

(73) Assignee: Yoti Holding Limited, London (GB)

( * ) Notice: Subject to any disclaimer, the term of this patent is extended or adjusted under 35 U.S.C. 154(b) by 219 days.

(21) Appl. No.: 16/907,021

(22) Filed: Jun. 19, 2020

(65) Prior Publication Data

US 2020/0320184 A1 Oct. 8, 2020

Related U.S. Application Data

(63) Continuation of application No. PCT/EP2018/086265, filed on Dec. 20, 2018.

(51) Int. Cl.
*G06F 21/32* (2013.01)
*G06N 3/04* (2023.01)
(Continued)

(52) U.S. Cl.
CPC ............ *G06F 21/32* (2013.01); *G06N 3/04* (2013.01); *G06N 3/08* (2013.01); *G06V 20/64* (2022.01);
(Continued)

(58) Field of Classification Search
None
See application file for complete search history.

(56) References Cited

U.S. PATENT DOCUMENTS 5,954,583 A 9/1999 Green
7,027,617 B1 4/2006 Frischholz
(Continued)

FOREIGN PATENT DOCUMENTS

CN 101114909 A 1/2008
EP 0970435 A2 1/2000
(Continued)

OTHER PUBLICATIONS

Centeno, Mario P., et al., "Smartphone Continuous Authentication Using Deep Learning Autoencoders," 2017 15th Annual Conference on Privacy, Security and Trust.
(Continued)

*Primary Examiner* — William J. Goodchild
(74) *Attorney, Agent, or Firm* — Knobbe, Martens, Olson & Bear, LLP

(57) ABSTRACT

One aspect provides a method of authenticating a user of a user device, the method comprising: receiving motion data captured using a motion sensor of the user device during an interval of motion of the user device induced by the user; processing the motion data to generate a device motion feature vector, inputting the device motion feature vector to a neural network, the neural network having been trained to distinguish between device motion feature vectors captured from different users; and authenticating the user of the user device, by using a resulting vector output of the neural network to determine whether the user-induced device motion matches an expected device motion pattern uniquely associated with an authorized user, the neural network having been trained based on device motion feature vectors captured from a group of training users, which does not include the authorized user.

17 Claims, 7 Drawing Sheets

(51) Int. Cl.

| | |
|---|---|
| *G06N 3/08* | (2023.01) |
| *H04L 9/08* | (2006.01) |
| *H04W 12/06* | (2021.01) |
| *H04W 12/65* | (2021.01) |
| *H04W 12/68* | (2021.01) |
| *G06V 20/64* | (2022.01) |
| *G06V 40/16* | (2022.01) |

(52) U.S. Cl.
CPC ......... *G06V 40/172* (2022.01); *H04L 9/0861* (2013.01); *H04W 12/06* (2013.01); *H04W 12/65* (2021.01); *H04W 12/68* (2021.01)

(56) References Cited

U.S. PATENT DOCUMENTS

| | | |
|---|---|---|
| 8,542,879 B1 | 9/2013 | Nechyba et al. |
| 8,649,573 B1 | 2/2014 | Darbari et al. |
| 8,837,835 B1 | 9/2014 | Samwel et al. |
| 8,856,541 B1 | 10/2014 | Chaudhury et al. |
| 9,075,975 B2 | 7/2015 | Bud |
| 9,147,117 B1 | 9/2015 | Madhu et al. |
| 9,202,105 B1 | 12/2015 | Wang et al. |
| 9,264,419 B1 | 2/2016 | Johansson et al. |
| 9,294,475 B2 | 3/2016 | Hoyos |
| 9,355,314 B2 | 5/2016 | Yang |
| 9,367,677 B1 | 6/2016 | Adhami et al. |
| 9,794,260 B2 | 10/2017 | Loughlin-McHugh et al. |
| 2002/0172419 A1 | 11/2002 | Lin et al. |
| 2005/0270386 A1 | 12/2005 | Saitoh et al. |
| 2006/0279726 A1 | 12/2006 | Galambos |
| 2006/0288234 A1 | 12/2006 | Azar et al. |
| 2009/0092294 A1 | 4/2009 | Uchida |
| 2009/0138405 A1 | 5/2009 | Blessing |
| 2011/0133799 A1 | 6/2011 | Dunworth et al. |
| 2011/0242304 A1 | 10/2011 | Ichige |
| 2012/0075452 A1 | 3/2012 | Ferren |
| 2013/0219480 A1 | 8/2013 | Bud |
| 2013/0336547 A1 | 12/2013 | Komogortsev |
| 2014/0016837 A1 | 1/2014 | Nechyba et al. |
| 2014/0075548 A1 | 3/2014 | Sampathkumaran |
| 2014/0191948 A1 | 7/2014 | Kim et al. |
| 2014/0307929 A1 | 10/2014 | Nechyba et al. |
| 2014/0337930 A1 | 11/2014 | Hoyos et al. |
| 2015/0026797 A1 | 1/2015 | Cao |
| 2015/0095996 A1 | 4/2015 | Tang |
| 2015/0264567 A1 | 9/2015 | Sensharma |
| 2015/0371024 A1 | 12/2015 | Kim et al. |
| 2016/0055323 A1 | 2/2016 | Stuntebeck et al. |
| 2016/0071111 A1 | 3/2016 | Wang et al. |
| 2016/0140390 A1 | 5/2016 | Ghosh et al. |
| 2016/0241531 A1 | 8/2016 | Loughlin-McHugh et al. |
| 2016/0241532 A1 | 8/2016 | Loughlin-McHugh et al. |
| 2016/0309329 A1* | 10/2016 | Chen ..................... H04L 43/16 |
| 2016/0323249 A1 | 11/2016 | Duncker et al. |
| 2016/0335483 A1 | 11/2016 | Pfursich et al. |
| 2017/0046583 A1 | 2/2017 | Rodriguez et al. |
| 2017/0048244 A1 | 2/2017 | Loughlin-McHugh et al. |
| 2017/0227995 A1* | 8/2017 | Lee ....................... G06N 20/00 |
| 2017/0337364 A1 | 11/2017 | Whaley et al. |
| 2018/0083973 A1 | 3/2018 | Paraskevas et al. |
| 2018/0089519 A1* | 3/2018 | Raziel .................... G06T 17/10 |
| 2018/0181737 A1 | 6/2018 | Tussy |
| 2018/0239955 A1 | 8/2018 | Rodriguez et al. |

FOREIGN PATENT DOCUMENTS

| | | | |
|---|---|---|---|
| EP | 1104143 | A2 | 5/2001 |
| EP | 2560123 | A1 | 2/2013 |
| EP | 2680191 | A2 | 1/2014 |
| EP | 2993619 | | 3/2016 |
| GB | 2358108 | | 7/2001 |
| GB | 2465782 | | 6/2010 |
| GB | 2501362 | A | 10/2013 |
| JP | 2006-040151 | A | 2/2006 |
| JP | 2006-235718 | A | 9/2006 |
| KR | 2009-0018440 | A | 2/2009 |
| KR | 2010-0103221 | A | 9/2010 |
| WO | WO 98/043216 | | 10/1998 |
| WO | WO 2014/021835 | | 2/2014 |
| WO | WO 2016/127008 | | 8/2016 |
| WO | WO 2017/191626 | | 4/2017 |
| WO | WO 2018/097651 | | 11/2017 |

OTHER PUBLICATIONS

Gadaleta, Matteo, et al., "IDNet: Smartphone-based gait recognition with convulational neural networks," Pattern Recognition 74 (2018) 25-37.

Gragnaniello et al., "An Investigation of Local Descriptors for Biometric Spoofing Detection," *IEEE Transactions on Information Forensics and Security*, vol. 10, No. 4, Apr. 2015, pp. 849-863.

Komulainen, "Software-based Countermeasures to 2D Facial Spoofing Attacks," University of Oulu Graduate School; University of Oulu, Faculty of Information Technology and Electrical Engineering, Department of Computer Science and Engineering; Infotech Oulu *Acta Univ. Oul.* C 537, Aug. 2015, in 92 pages.

Papavasileiou, Ioannis, et al., "Gait-based Continuous Authentication using Multimodal Learning," 2017 IEEE/ACM International Conference on Connected Health: Applications, Systems and Engineering Technologies.

Wang et al., "Face Liveness Detection Using 3D Structure Recovered from a Single Camera," 2013 International Conference on Biometrics (ICB), Jun. 4-7, 2013, in 6 pages.

Xie, Cheche, et al., "Walking recognition method for physical activity analysis system of child based on wearable accelerometer," Proceedings of the 2017 IEEE International Conference on Robotics and Biomimetics, Dec. 5-8, 2017, Macau SAR, China.

Zhao, Yongjia, et al., "Wearable Device-Based Gait Recognition Using Angle Embedded Gait Dynamic Images and a Convolutional Neural Network," Sensors 2017, 17, 478.

Exam Report dated Aug. 13, 2019 in Application No. GB1903784.5.

International Search Report dated Nov. 4, 2016 in corresponding International Application No. PCT/EP2016/069084, filed Aug. 10, 2016.

International Search Report dated Nov. 11, 2016 in corresponding International Application No. PCT/EP2016/069079, filed Aug. 10, 2016.

International Search Report dated Feb. 2, 2019 in corresponding International Application No. PCT/EP2018/086265, filed Dec. 20, 2018.

Search Report dated Jul. 19, 2013 in GB Patent Application No. 1303067.1, granted as GB 2501362 A, Oct. 23, 2013.

Search Report dated Nov. 20, 2018 in Application No. GB1721636.7.

Search and Exam Report dated Jan. 30, 2019 in Application No. GB1721636.7.

Search and Exam Report dated Mar. 29, 2019 in Application No. GB1721636.7.

Search and Exam Report dated Nov. 21, 2019 in Application No. GB1721636.7.

Search and Exam Report dated Apr. 10, 2019 in Application No. GB1903784.5.

* cited by examiner

BIOMETRIC USER AUTHENTICATION

FIELD

This disclosure relates to biometric user authentication.

BACKGROUND

There are many situations in which a user of a device may be authenticated. For example, a local authentication may be performed in order to "unlock" the device, to ensure that only an authorized user can access the device's core functions and data. Another example is "online" authentication, in which a user is authenticated with a remote authentication server in order to gain access to data or services etc.

Traditional authentication is based on usernames, passwords, PINs and the like, where the user is authenticated based on secret knowledge, which it is assumed is only known to that user.

Increasingly, biometric authentication is being used in various contexts. With biometric authentication, users are authenticated based on their human characteristics, such as their face, eye structure, fingerprint and the like.

SUMMARY

The invention provides various authentication mechanisms based on device motion, and in particular on a user's ability to replicate, by moving a user device, an expected device motion pattern that is uniquely associated with an authorized user. The characteristics of the device motion pattern that make it unique are referred to herein as "behavioural biometrics", and the authentication process is ultimately checking for the presence or absence of matching behavioural biometrics.

A first aspect of the present invention provides a method of authenticating a user of a user device, the method comprising: receiving motion data captured using a motion sensor of the user device during an interval of motion of the user device induced by the user; processing the motion data to generate a device motion feature vector, inputting the device motion feature vector to a neural network, the neural network having been trained to distinguish between device motion feature vectors captured from different users; and authenticating the user of the user device, by using a resulting vector output of the neural network to determine whether the user-induced device motion matches an expected device motion pattern uniquely associated with an authorized user, the neural network having been trained based on device motion feature vectors captured from a group of training users, which does not include the authorized user.

Here, the neural network operates as a feature extractor, which extracts/emphasises features that are relevant to the user authentication task, i.e. the pre-trained neural network is used during inference to subsequently extract/refine device motion features captured in the device motion feature vector input to the network. Advantageously, this neural network can be pre-trained based on the data from the group of representative training users without requiring any data from the device user who is ultimately to be authenticated. Using the neural network as a pre-trained feature extractor significantly reduced the amount of training data that needs to be captured from the device user during enrolment, i.e. when setting-up the motion-based authentication. That is, in order to be able to make the determination as to whether the vector output from the trained neural network matches the expected device motion pattern associated with the authorised user, only a small amount of data needs to be captured from the authorized user (to "fine-tune" the system to the specific task of recognizing that specific user based on device motion)—e.g. only one or a few examples of the expected device motion pattern. This is because the bulk of the learning has already been done when the neural network was pre-trained based on data from the representative training group.

In embodiments, the authentication step may comprise classifying, by a classifier, the vector output of the neutral network as matching or not matching the expected device motion pattern.

The classifier may have been trained for classifying the vector output of the neural network based on one or more earlier device motion feature vectors captured from the authorized user and corresponding to the expected device motion pattern.

As indicated above, where a classifier is applied to the vector output of the pre-trained neural network in this manner, the classifier can be trained to perform this classification on a significantly reduced number of examples of the authorized user's expected device motion pattern.

The classifier may be a one-class classifier trained without using any data captured from any unauthorized user.

Alternatively, the classifier may be a binary classifier trained using one or more earlier device motion feature vectors captured from at least one unauthorised user.

The classifier may for example be a support vector machine (SVM).

According to a second aspect of the present invention, a method of authenticating a user of a user device comprises: receiving motion data captured using a motion sensor of the user device during an interval of motion of the user device induced by the user; processing the motion data to generate a device motion feature vector, inputting the device motion feature vector to a neural network, the neural network having been trained to distinguish between device motion feature vectors captured from different users; and authenticating the user of the user device, by using a resulting vector output of the neural network to determine whether the user-induced device motion matches an expected device motion pattern uniquely associated with an authorized user. The neural network has been trained, based on one or more earlier device motion feature vectors captured from the authorized user and corresponding to the expected device motion pattern, to reproduce, as vector outputs, inputted device motion feature vectors captured from the authorized user and corresponding to the expected device motion pattern. The authentication step comprises determining whether the vector output exhibits a significant discrepancy from the device motion feature vector inputted to the neural network.

The second aspect of uses a neural network which has—in contract to the first aspect—been trained on the authorized user's own motion data. In the second aspect, if the authorized user on whose data the neural network has been trained subsequently provides motion data, then when that motion data is fed to the neural network, the output of the neural network should substantially match its input. However, if a different user provides motion data, the output of the neural network will be materially different from the corresponding input.

A benefit of this architecture is that the neural network can be trained to distinguish between authorized and unauthorized users using only examples captured from the authorized user, i.e. without requiring any training data from any other users (who are not authorized in this context).

Features will now be disclosed which may be implemented in embodiments of any aspect of the invention disclosed herein.

If the user-induced device motion is determined to match the expected device motion pattern, the user of the user device may be granted access to at least one of: a function of the user device, a service, and data to which the authorized user is permitted access.

The vector output may be an output of a hidden layer of the neural network.

The neural network may be a convolutional neural network (CNN).

The device motion feature vector may comprise temporal motion values of or derived from the motion data.

Alternatively or in addition, the motion data may comprise a time series of device motion values, and the method may comprise a step of applying a domain transform to at least a portion of the time series to determine at least one device motion spectrum in the frequency domain. The device motion feature vector may comprise coefficients of the said at least one device motion spectrum or values derived from coefficients of the said at least one device motion spectrum. For example, the device motion feature vector may comprises logarithmic values and/or cepstral coefficients determined from the device motion spectrum.

Multiple device motion spectra may be determined, each by applying a domain transform to a respective portion of the time series of device motion values, and analysed to determine whether the user-induced motion of the user device matches the expected device motion pattern.

The method may comprise: receiving image data captured using an image capture device of the user device during the interval of user-induced device motion; wherein the authentication step may comprise analysing the image data to determine whether three-dimensional facial structure is present therein.

The authentication step may comprise comparing the image data with at least some of the device motion values, to verify that movement of the three-dimensional facial structure, if present, corresponds to the user-induced device motion.

The vector output of the neural network may be used in combination with facial recognition to authenticate the user of the device.

According to a third aspect of the present invention, a method of authenticating a user of a user device comprises: receiving motion data captured using a motion sensor of the user device during an interval of motion of the user device induced by the user; receiving a moving image data captured using an image capture device of the user device during the interval of user-induced device motion; and authenticating the user of the user device by (i) analysing the motion data to determine whether the user-induced device motion matches an expected device motion pattern uniquely associated with an authorized user, and (ii) analysing the image data to determine whether three-dimensional facial structure is present therein.

The third aspect of the invention combines device motion-based authentication with what is referred to herein as "structure-based face anti-spoofing", which refers to a set of methods based on the observation that a two-dimensional image of a face is the result of the projection of the 3D face on a 2D image plane. This observation enables a technique to be used where, given as few as two video frame images from different angles of the same face, it is possible to distinguish robustly between a static print attack (in which a 2D image of a face is presented in an attempt to spoof the system) and genuine input.

In embodiments, the user may be authenticated based on the analysis of the device motion in combination with facial recognition applied to the image data. In this context, the structure-based face anti-spoofing provides robustness against an attempt to spoof the facial recognition element using a pre-captured image of the authorized user.

The authentication step may comprise comparing the image data with the motion data, to verify that movement of the three-dimensional facial structure, if present, corresponds to the user-induced device motion. This provides robustness to a replay attack using a moving image of the authorized user's face, as described in further detail below.

A fourth aspect of the invention provides a method of authenticating a user of a user device, the method comprising: receiving a time series of device motion values captured using a motion sensor of the user device during an interval of motion of the user device induced by the user; applying a domain transform to at least a portion of the time series to determine at least one device motion spectrum in the frequency domain; and authenticating the user of the user device by analysing the said at least one device motion spectrum to determine whether the user-induced device motion matches an expected device motion pattern uniquely associated with an authorized user.

Here, it is the unique characteristics of the device motion spectrum that are used as a basis for the authentication. These are not necessarily measured directly from the spectrum (though that is not excluded), and in preferred embodiments cepstral coefficients are extracted from the spectrum and used to perform the authentication.

In embodiments, the analysing step may comprise determining a set of logarithmic values from the said at least one device motion spectrum, the set of logarithmic values being used to determine whether the user-induced device motion matches the expected device motion pattern, each of the logarithmic values being determined as a logarithm of a respective spectral coefficient of the said at least one device motion spectrum.

The analysing step may comprise determining a set of cepstral coefficients by applying a second domain transform to the set of logarithmic values, the set of cepstral coefficients being used to determine whether the user-induced motion matches the expected device motion pattern.

The analysing step may comprise inputting to a neural network a device motion feature vector comprising the cepstral coefficients, and using a resulting vector output of the neural network to determine whether the user-induced motion matches the expected device motion pattern, the neural network having been trained to distinguish between such device motion feature vectors captured from different users.

Accordingly, the device motion spectrum may, in embodiments, be subject to a quite extensive series of transformations before the final result is arrived at. Each transformation stage is performed in a way that retains enough information about the behavioural biometrics captured in the original device motion data, with the aim of placing that information in a form that makes it possible to reliably determine whether the captured behavioural biometrics match those of the authorised user.

More generally, the analysing step may comprise inputting to a neural network a device motion feature vector comprising coefficients of the said at least one device motion spectrum or values derived from coefficients of the said at least one device motion spectrum. For example, the spectrum or parts of the spectrum (directly), or values derived from the spectrum in some other way could be inputted to the neural network as the device motion feature vector.

More generally still, a fifth aspect of the invention provides a method of authenticating a user of a user device, the method comprising: receiving motion data captured using a motion sensor of the user device during an interval of motion of the user device induced by the user; processing the motion data to generate a device motion feature vector; inputting the device motion feature vector to a neural network, the neural network having been trained to distinguish between device motion feature vectors captured from different users; and authenticating the user of the user device, by using a resulting vector output of the neural network to determine whether the user-induced device motion matches an expected device motion pattern uniquely associated with an authorized user.

For example, in embodiments of the fifth aspect, the device motion feature vector may comprise temporal motion values (motion values in the time domain) of or derived from the device motion data (without requiring calculation of the spectrum). These could be raw values, or other time-domain values such as time averages.

All of the following applies equally to any of the above-mentioned neural networks in embodiments of the any of the aforementioned aspects of the invention, whatever the form of the device motion feature vector it receives. That is, 'the neural network' in the following can be the neural network in any embodiment of the above.

The neural network tray be a convolutional neural network (CNN).

The analysing step may comprise classifying, by a classifier, the vector output of the neutral network as matching or not matching the expected device motion pattern (as a means of analysing the input device motion feature vector and thus the motion data from which it is obtained).

The neural network may have been trained based on device motion feature vectors captured from a group of training users, which does not include the authorized user.

The classifier may have been trained based on one or more earlier device motion feature vectors captured from the authorized user and corresponding to the expected device motion pattern.

The classifier may be a one-class classifier trained without using any data captured from any unauthorized user.

Alternatively, the classifier may be a binary classifier trained using one or more earlier device motion feature vectors captured from at least one unauthorised user.

The classifier may be a support vector machine (SVM).

Alternatively, the neural network has been trained based on one or more earlier device motion feature vectors captured from the authorized user and corresponding to the expected device motion pattern; wherein the analysing step may comprise determining whether the vector output exhibits a significant discrepancy from an expected vector output.

The neural network may have been trained to reproduce, as vector outputs, inputted device motion feature vectors captured from the authorized user and corresponding to the expected device motion pattern; wherein the analysing step may comprise determining whether the vector output exhibits a significant discrepancy from the device motion feature vector inputted to the neural network.

The second domain transform may be a discrete cosine transform (DCT) or an inverse Fourier transform (IFT) applied to the set of logarithmic values.

The domain transform may be a Fourier transform. For example, the device motion spectrum may be a power spectrum, which is determined by determining a power of each spectral coefficient of a Fourier spectrum determined by the Fourier transform.

Multiple device motion spectra may be determined, each by applying a domain transform to a respective portion of the time series of device motion values, and analysed to determine whether the user-induced motion of the user device matches the expected device motion pattern.

The or each device motion spectrum may be filtered by a bank of filters, wherein each of the logarithmic values is a logarithm of an energy of a respective filtered version of the device motion spectrum determined by a respective one of those filters.

In embodiments, the method of any of the above aspects may comprise: receiving image data captured using an image capture device of the user device during the interval of user-induced device motion; wherein the authentication step may comprise analysing the image data to determine whether three-dimensional facial structure is present therein.

The authentication step may comprise comparing the image data with at least some of the device motion values, to verify that movement of the three-dimensional facial structure, if present, corresponds to the user-induced device motion.

Note that in embodiments of the third aspect, a neural network may not be needed at all. For example, it may be possible to achieve the desired result by training a classifier on any of the above-mentioned type of feature vectors, so that the classifier can classify the user based on the feature vector directly.

Another aspect of the invention provides a user authentication system for authenticating a user of a user device, the user authentication system comprising: an input configured to receive motion data captured using a motion sensor of the user device during an interval of motion of the user device induced by the user; a one or more processors configured to execute computer readable instructions, and thereby implement the steps of the first or second aspect or any embodiment thereof.

Another aspect of the invention provides a computer program product for authenticating a user of a user device, the computer program product comprising computer-readable instructions stored on a non-transitory computer-readable storage medium and configured, when executed, to implement the steps of the first or second aspect or any embodiment thereof.

BRIEF DESCRIPTION OF FIGURES

For a better understanding of the invention, and to show how embodiments of the same may be carried into effect, reference is made by way of example only to the following figures, in which.

DETAILED DESCRIPTION OF EXAMPLE EMBODIMENTS

Figure 1:
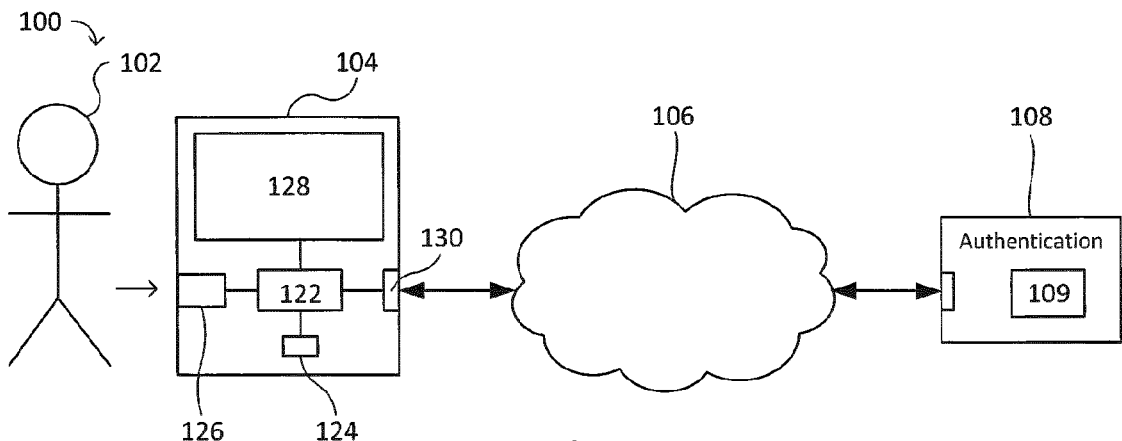
FIG. 1 shows a schematic block diagram of a system for authenticating a user.

FIG. 1 shows a schematic block diagram of a system 100 for authenticating a user 102. The user 102 is a user of a moveable user device 104, which is a mobile device such as a smartphone. In general, the mobile device 104 can be a hand-held or wearable device or any other device which can be easily moved by the user 102. In accordance with the invention, the user 102 is authenticated based at least in part on his ability to replicate, with sufficient accuracy, an expected device motion pattern that is uniquely associated with an authorised user of the device 104, in order to determine whether or not the user 102 is the authorised user (motion-based authentication).

As described below, characteristics of the device motion pattern that make it unique to the authorized user are learned from the authorized user by training a classifier. It may be that any user, when setting-up the motion-based authentication, is asked to perform a specific type of device motion as part of the process in which that user becomes associated with a unique device motion pattern. This could for example be moving a device from side to side or up and down a predetermined number of times. In that event, multiple users may be associated with broadly similar device motion patterns (e.g. up-down-up-down, left-right-left-right etc.), but which exhibit subtle but measurable variations that are unique to the user in question. Alternatively, a user may be given more freedom in setting their own device motion pattern (e.g. the user may be more or less free to move the device however he sees fit), in which case device motion patterns can be expected to have more pronounced differences between different users. Whatever constraints are placed on the form of the device motion pattern, characteristics that make it unique to a particular user, and that are consistently exhibited by that user such that they can be used as a basis for identifying that user, constitute that user's behavioural biometrics as that term is used herein. The motion-based authentication can be seen as a form of biometric authentication based on such behavioural biometrics.

In an extension of the core concept, the motion-based authentication can be combined with an image-based "liveness test". For the liveness test, image data is recorded simultaneously with the motion data, preferably using a front-facing camera of the user device so as to capture a video image of the user's face. As the device is moved, the user's face—assuming it is a real three-dimensional face—exhibits a form of parallax due to its 3D structure, whereby features appear to move at different speeds and by different amounts in the plane of the image in dependence on their depth within the image capture device's field of view (i.e. their distance away from the image capture device along its optical axis). Not only can this be used to verify the presence of actual three-dimensional facial structure (as opposed to a two-dimensional image held in front of the image capture device in an attempt to spoof the system—a form of "replay attack"), but by comparing the movement exhibited by the facial structure in the image with the same motion data that is used to authenticate the user to check those data match, it can be determined with a high level of confidence whether the device motion has been induced by an actual living human holding the user device 104, in addition to authenticating the user 102. This is described in further detail later.

The user device 104 is shown to comprise at least one processor 122, comprising one or more CPU(s) and/or GPU(s) or other specialized processing hardware, such as FPGA(s) etc. In addition, the user device 104 is shown to comprise at least one motion sensor 124, an image capture device 126, a display 128 and a network interface 130 via which the user device 104 can connect to a computer network 106, such as the Internet. The processor(s) 122 fetches computer-readable instructions from a memory (not shown) and executes those instructions in order to carry out the functionality of the user device 104 that is described herein. The motion sensor 124, image-capture device 126, display 128 and network interface 130 are shown connected to the processor 122, which allows the process 122 to use these components to carry out the functions described later. In some implementations, the user 102 is authenticated at a remote authentication server 108 (or other back-end authentication system) by way of a remote user authentication process between the user device 102 and the authentication server 108. The authentication server 108 is shown to comprise one or more processing units 109, such as CPU(s) and/or GPU(s) or other specialized processing hardware, such as FPGA(s) etc. The processing unit(s) 109 fetch computer-readable instructions from a memory (not shown) and execute those instructions in order to carry out the functionality of the authentication server 108 that is described herein. The user device 104 communicates with the remote authentication server 108 via the computer network 106 in order to carry out the user authentication process. In other implementations, the authentication can be a local user authentication that is carried out at the user device 104 itself. In this case, the user authentication functions can be executed by the at least one processor 122 of the user device 104.

The motion sensor 124 is used to capture device motion data, in the form of a time series of device velocity or acceleration values, motion values. The motion sensor 124 can be any type of sensor that can be used to measure or estimate the instantaneous velocity and/or acceleration of the user device 104 at a particular time instant, either on its own or in combination with another sensor(s). Here, velocity refers to angular velocity, i.e. the rate with which the device rotates about up to three axes (linear velocity could be estimated by integrating acceleration if desired). That is, a single motion sensor, such as an accelerometer, can be used for this purpose, or alternatively the user device 104 may comprise multiple sensors which can be used in conjunction with each other to achieve the same outcome. For example, a combination of an accelerometer and a gyroscope could be used to generate the device motion data. Each device motion value can be a vector of up to six values (three acceleration, three angular velocity).

Figure 2:
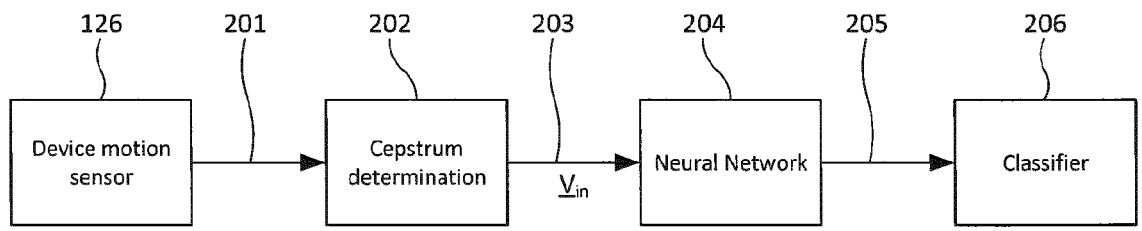
FIG. 2 shows functional blocks of a user authentication system.

FIG. 2 shows a high-level schematic function block diagram showing functional components of a user authentication system, which co-operate to perform the user authentication. In particular, FIG. 2 shows a cepstrum determination component 202, a neural network 204 and a classifier 206. In the case of a remote authentication, the components 202, 204 and 206 represent respective parts of the functionality of the authentication service 108. That is, functionality implemented by computer-readable instructions when executed at the back-end authentication system 108. However, in other implementations some or all of this functionality could be imprinted at the user device 104 instead, for example. Accordingly the authentication system of FIG. 2 can be implemented at the back-end system 108, the user device 104 or as a distributed system formed of the user device 104 and the back-end 108.

The cepstrum determination component 202 is shown having an input connected to receive the device motion data (labelled 201) as generated using the at least one motion sensor 126 of the user device 104. The cepstrum determination component 202 determines, from the device motion data 201, a set of cepstral coefficients 203. With vector motion values, this can be done for each dimension separately or the vectors can be converted to scalar (e.g. magnitude) values first. Cepstral coefficients are a way of representing a short-term power spectrum of a time-varying signal. This is described in further detail later but for now suffice it to say that, in order to determine the cepstral coefficients 203, the device motion data 201, which as noted is in the form of a time series of motion values, is transformed into a set of short-term spectra in the frequency domain, from which the cepstral coefficients are then derived.

There are various ways of defining cepstral coefficients and the manner in which they are computed depends on how they are defined. However, with reference to FIG. 3, what these have in common is that a time-varying signal (in this case the time series of device motion values 201) or a portion thereof is transformed into a spectrum in the frequency domain, at block 302 in FIG. 3, by applying a first domain transform such as a Fourier transform, e.g. Fast Fourier Transform (FFT). A set of logarithmic values is determined from spectral coefficients of the frequency-domain spectrum, at block 304, and a second domain transform is applied to the logarithmic values, at block 306, in order to determine the cepstral coefficients 203. Theoretically, an Inverse Fourier Transform (IFT) would be appropriate where the first domain transform is a Fourier transform, however in practice it may be equally viable to implement the second domain transform as a Discrete Cosine Transform (DCT) or similar.

Returning to FIG. 2, the cepstral coefficients 203 are used to form a feature vector that is input to the neural network 204. The feature vector is denoted $v_{in}$ and is also referred to as the input vector. The dimension of the input vector $v_{in}$ (the number of components it has) is denoted $D_{in}$. Each component of the feature vector $v_{in}$ may simply be one of the cepstral coefficients, or additional processing may be applied to the cepstral coefficients to form the feature vector $v_{in}$. The input vector $v_{in}$ embodies device motion information, in a form suitable for interpretation by the neural network 204. That information has ultimately been derived from the captured motion data 201. Such a feature vector is referred to as a device motion feature vector herein.

A resulting vector output 205 of the neural network 204 is then used, by the classifier 206, to classify the user 102 as authorised or not authorised. To achieve this, the vector output 205 needs to capture sufficient information about the motion of the user device 104 as induced by the user 102 in a form that can be interpreted by the classifier 206, so that classified 206 can determine whether the user-induced motion of the device 104 matches the expected device motion pattern that is uniquely associated with the authorised user. In other words, the vector output 205 must adequately capture the behavioural biometrics of the user 102. Various example architectures which can achieve this are described later.

Figure 4A:
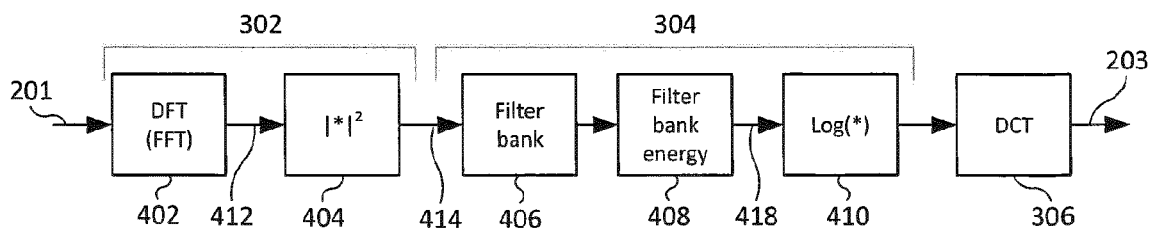
FIG. 4A shows the functions of an example user authentication system in greater detail.

FIG. 4A is a function block diagram illustrating how the cepstral coefficients 203 can be generated in one embodiment. To aid illustration, FIG. 4B provides a graphical illustration of some of the functions performed by the components of FIG. 4A.

Figure 3:
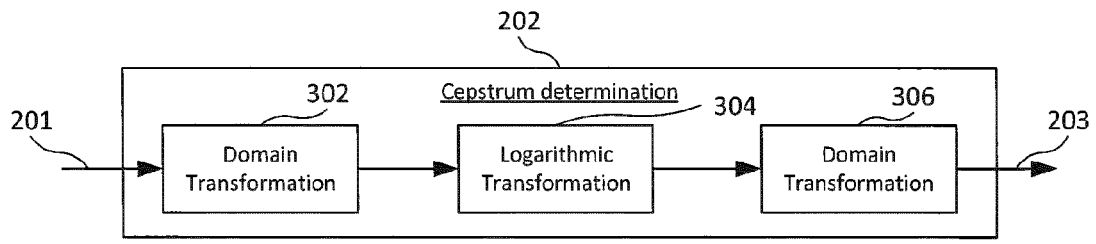
FIG. 3 shows functional blocks of a cepstrum determination component.
Figure 4B:
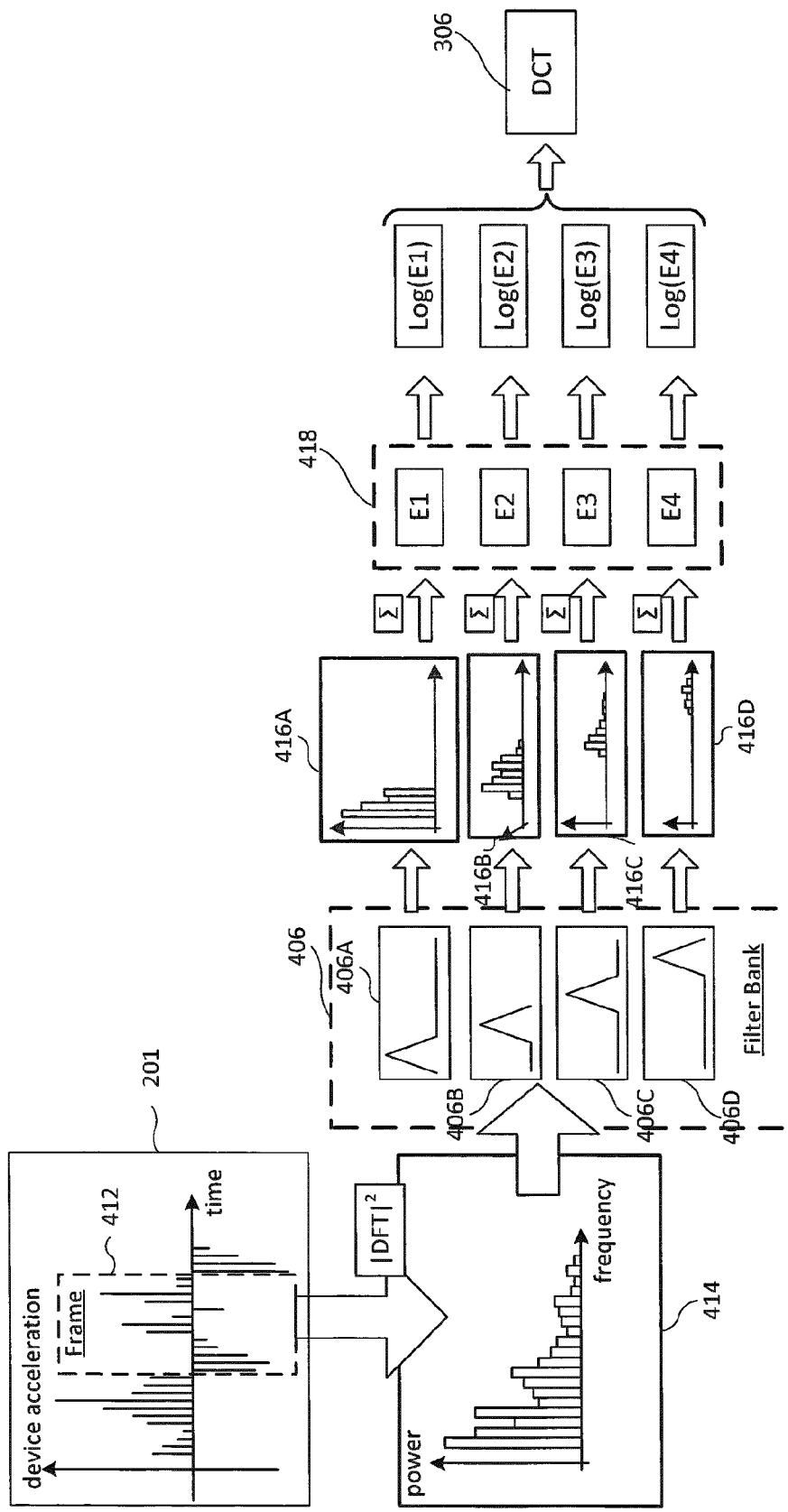
FIG. 4B provides a graphical illustration of some of the functions of FIG. 4A.

With reference to FIGS. 4A and 4B, at block 402 a Discrete Fourier Transform (DFT), which is implemented as a Fast Fourier Transform (FP 1), is applied to the device motion data 201. In this example, a FFT is in fact applied on a per-frame basis. That is, the device motion data 201 is divided into short temporal frames 412 and a FFT is applied to each frame 412 in order to generate a spectrum for that frame 412 (short-term spectrum). The output of the FFT block 402 is a set of (complex) spectral coefficients which are converted to a power spectrum 414 for the frame in question, at block 404, for example by taking the magnitude or (in this example) the magnitude$^2$ of each of these spectral coefficients. Block 402 together with block 404 corresponds to block 302 in FIG. 3, in that they transform the time-domain device motion data 201 into a power spectrum in the frequency domain (device motion spectrum) 414.

After dividing the signal into frames and before calculating FFT windowing can be performed. Simply cutting the frames out introduces discontinuities at the beginning and the end of the frame which in turn can result in undesirable artefacts in the frame spectrum. In order to avoid that, the frame can be multiplied element-wise by a specially designed window which effectively fades in and fades out the signal. An example of a suitable window is the Hann window. Windowing in the context of digital signal processing is known per se, and it is not described in fuller detail for that reason.

In order to determine the logarithmic values, in this example, the device motion spectrum 414 is filtered by a filter bank 406 as shown in FIG. 4B. The filter bank 406 is a bank of filters (406A to 406D) each of which is tuned to a different frequency band and is designed to filter out the parts of the power spectrum 414 outside of that band. Four individual filters are shown but in practice there may be more filters than this. In this example, each of the filters 406A to 408D is a triangular filter, whose output is a multiplication of the power spectrum 414 with a triangular function centred on a particular frequency. The output of each of the individual filters 406A to 406D is a respective filtered version of the device motion spectrum 414, denoted 416A to 416D for filters 406A to 406D respectively.

At block 408, the energy of each of the filtered spectra 416A to 416D is computed. The result is a set of energy values 418, one for each filtered spectrum 416A to 416$d$, denoted E1 to E4 in FIG. 4B. Each of the energy values E1 to E4 represents an overall energy of the filtered spectrum 416A to 416D from which it is computed. Each can be computed by summing at the spectral coefficients of the filtered spectrum in question, or some other computation to determine an overall value representative of the spectrum energy (or magnitude).

At block 410 in FIG. 4A, a logarithm of each of the energy values E1 to E4 is computed, denoted log(E1) to log(E4).

Blocks 406, 408 and 410 in conjunction correspond to block 304 in FIG. 3.

Finally, in order to compute the cepstral coefficients 203, in this example a DCT transform is applied, at block 306, to the set of logarithmic values to obtain the set of cepstral coefficients 203.

A viable option is to compute the so-called Mel-frequency cepstral coefficients (MFCCs). These are used in audio processing, and a characteristic of MFCCs is that the filter-bank is chosen so as to transform the power spectrum to the so-called Mel scale. This has the effect of weighting different frequencies according to how responsive the human ear is to those frequencies. There is no particular need to do this in the present context. However, in practice it has been found that the device motion spectrum is confined to a relatively narrow part of the spectrum, such that the effect of the Mel transformation is negligible. Accordingly, although in principle there is no particular benefit to using MFCCs, they are nonetheless a viable choice, and a practical benefit is that, due to their adoption in audio processing, they can be computed using existing library functions and the like.

These operations are performed for each frame 412 of the time series of device motion values 201 to obtain a set of cepstral coefficients 203 for each frame 412. As indicated above, it is these cepstral coefficients that are used to form the input vector $v_{in}$ that can be understood by the neural network 204. The input vector $v_{in}$ can for example comprise cepstral coefficients determined for multiple frames of the device motion data 201 as predetermined dimensions of the input vector $v_{in}$, and could potentially have a large number of values (high dimensionality).

There are various viable neural network architectures that can provide a meaningful vector output 205 based on such an input vector $v_{in}$.

A first neural network 204A, having a first architecture, will now be described with reference to FIGS. 5 and 6.

Figure 5:
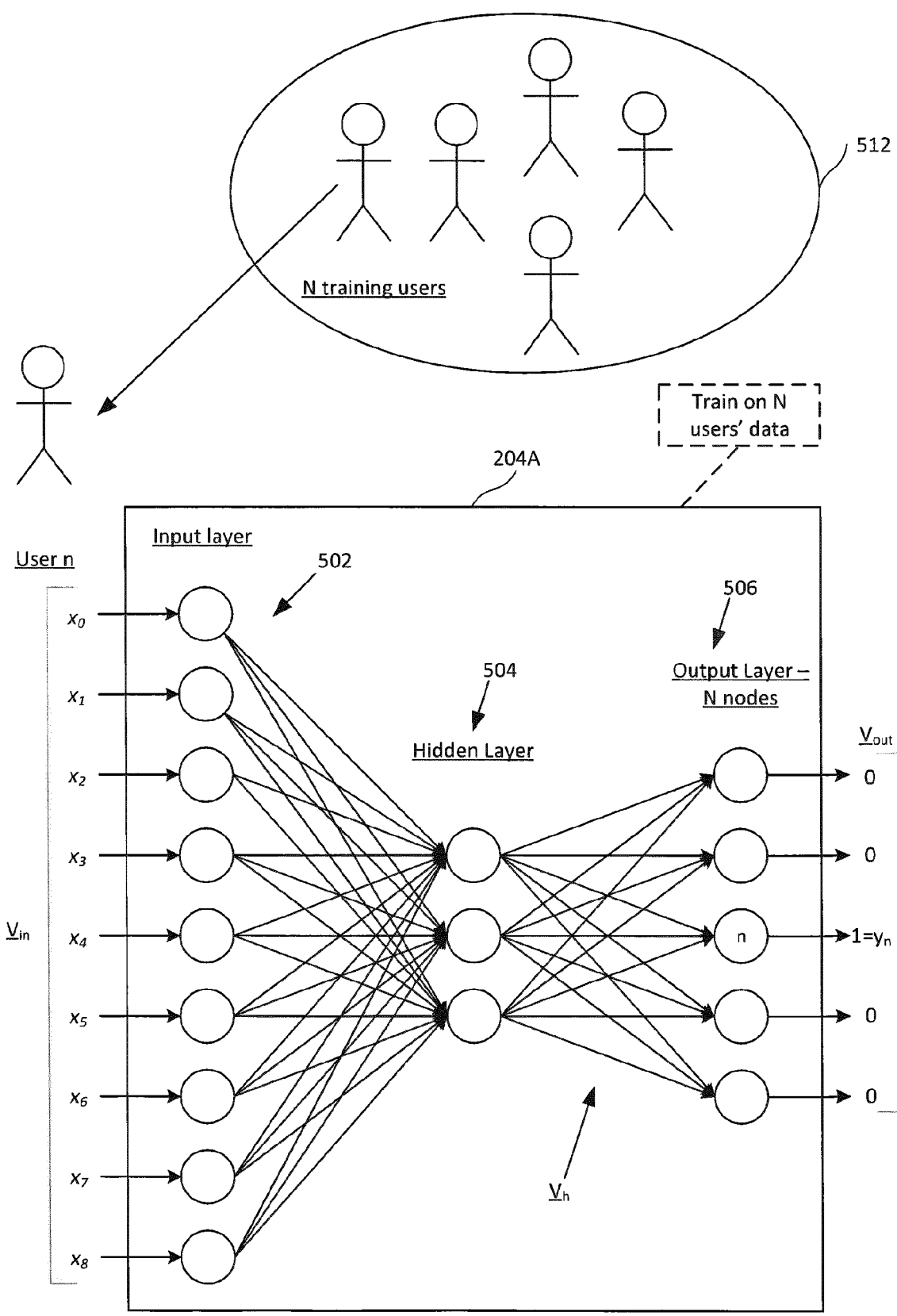
FIG. 5 shows a schematic block diagram of a first neural network in a training phase.

FIG. 5 schematically illustrates some of the principles according to which the first neural network 204A is trained. The first neural network 204A is shown to comprise an input layer 502, at least one hidden layer 504 and an output layer 506. The hidden layer 504 is shown connected to receive inputs from the input layer 502, and the output layer is shown connected to receive outputs from the hidden layer 504. Example arrangements of these connections are described below. For a neural network with multiple hidden layers, the first of the hidden layers connects to the input layer 502 and the last of the hidden layers connects to the output layer 506, with each but the first hidden layer connected to receive inputs from the previous hidden layer. Accordingly, with three or more hidden layers, at least one (intermediate) hidden layer is connected to both receive input from the previous hidden layer and to provide outputs to the next hidden layer.

The neural network layers 502, 504 and 506 are shown to comprise respective nodes, with each node of the hidden layer 504 having an input connected to an output of each of the nodes of the input layer, and each node of the output layer 506 having an input connected to an output of each of the nodes of the hidden layer 504. This is an example of a "feedforward" arrangement, and alternative arrangements may be viable (see below example, there is only one hidden layer but as will be appreciated with multiple hidden layers intermediate hidden layers may be connected to each other in a similar manner.

Purely by way of example the input layer 502 is shown as having nine nodes, the hidden layer 504 three nodes and the output layer 506 five nodes, however is expected that in practice each layer could have significantly more nodes than this. As will become apparent, in this particular example, it may be beneficial for the hidden layer 504 to have fewer nodes than the input layer 502 in order to achieve a level of dimensionality reduction, particular where the dimension of the input vector is high.

Herein the input vector is denoted:

$$v_{in}=(x_0, x_1, \ldots, x_{D_{in}-1})$$

where $x_i$ denotes the $i^{th}$ component of the feature vector $v_{in}$ and corresponds to one of the cepstral coefficients. The dimension of the feature vector $v_{in}$ is denoted $D_{in}$. Nodes within the neural network layers 502, 504, 506 are labelled as (l,j)—denoting the jth node in layer l—with l=0, 1, 2 respectively; hence:

The $j^{th}$ node in the input layer 502 is labelled (0, j);
The $j^{th}$ node in hidden layer 504 is labelled (1, j);
The $j^{th}$ node in the output layer 506 labelled (2, j).

Further details of the specific architecture of FIG. 5 are described below.

First, a more general point is made, which is that, ultimately, a neural network is a combination of an algorithm executed on one or more processing units and a set of electronically-stored weights, with the algorithm being configured to process input data, i.e. the input vector $v_{in}$, based on the electronically-stored weights, in order to generate output data, in the form of an output vector denoted:

$$v_{out}=(y_0, \ldots, y_{D_{out}-1})$$

of dimension $D_{out}$. The algorithm processes the input vector $v_{in}$ in stages, which are represented by the layers of the neural network. At each stage, the algorithm applies weights in the matter described below to the data being processed at that stage. The weights are stored in memory and selected during training in a recursive process performed with the objective of minimizing a loss function applied to the input vector $v_{in}$ and the output vector $v_{out}$ and denoted:

$$L(f(v_{in}), v_{out})$$

where, $f(*)$ is an objective (target) function such that, when $L(t(v_{in}), v_{out})$ is sufficiently minimized, $v_{out} \approx f(v_{in})$. That is, $f(v_{in})$ is the desired output of the neural network in response to $v_{out}$, or to put it another way the function the neural network is trained to model, which for conciseness is denoted:

$$\hat{v}_{out}=(y_0, \ldots, y_{D_{out}-1}):=f(v_{in}).$$

and which also has dimension $D_{out}$.

The training terminates when selected stopping criteria are met. The choice of stopping criteria is context-dependent, and they are chosen so as to minimise the loss function enough to achieve the objective but not so much as to cause significant "over-fitting". In a nutshell, over-fitting means that the neural network has "memorized" the training data very well, but to the detriment of its ability to generalize that learning to data it has not seen before. At this point, the neural network can be said to have learned the target function $f(*)$, and a key benefit of a properly-trained neural network is that it is able to approximate the objective function $f(*)$ for input vectors that exist in the same vector space as the training vectors but which the neural network has never encountered before; that is, the natural network is capable of generalizing from a relatively narrow set of training data when properly trained.

The loss function is evaluated at the output layer, in that it is applied to the output of the output layer $v_{out}$ (viewed the other way round, the output layer can be defined at the layer at which the loss function is evaluated in training). By contrast, the output of the hidden layer(s) is not considered explicitly during training and, unlike the output layer output layer $v_{out}$, the output of the hidden layer(s) does not directly contribute to the loss function $L(f(v_{in}), v_{out})$, but only indirectly contributes to it in that the output $v_{out}$ of the output layer varies in dependence on the output of the hidden layer(s).

Ultimately, a trained neural network means the algorithm in combination with a set of electronically-stored weights that have been selected to achieve an objective with respect to a loss function evaluated at the output layer. Once the weights have been learned on a particular computing platform, they can be moved to or duplicated between different computing platforms in order to make use of those weights. Moreover, in some cases, a subset of the weights might be discarded altogether once training is complete; as will become apparent, this is viable in the following example, as it is a vector output $v_h$ of the hidden layer that is used once training is complete to determine whether or not the user from which $v_h$ has been captured is authorized.

A common choice for the loss function is mean squared error (MSE):

$$L(f(v_{in}), v_{out}) = \frac{1}{D_{out}} |v_{out} - f(v_{in})|^2$$

However as discussed below, there are viable alternative loss functions, and alternative loss functions may give a performance benefit in some cases in the present context.

Each node of the neural network represents a computation that is performed by the algorithm on a particular set of inputs using a particular set of weights. Each node can thus be seen as a functional module of a computer program embodying the algorithm.

Each hidden layer and output layer node (l,j) computes its respective output as:

$$o_{l,j} = g\left(\left(\sum_i w_{l,j,i} * i_{l,j,i}\right) + b_{j,l}\right) \quad (1)$$

That is, as a function g(*) (the activation function) of a sum of the inputs ($i_{l,j,1}$, $i_{l,j,2}$, ... ) received at that node (l,j), weighted according to that node's set of weights ($w_{l,j,1}$, $w_{l,j,2}$, ... ), and an (optional) bias term $b_{j,l}$. The activation function g(*) is generally a non-linear function, to allow the neural network to learn non-linear functions. It is relatively unusual in modern neural networks for the activation function to differ between layers, and even less usual for it to differ between nodes in the same layer because that can reduce the extent to which the neural network can be implemented efficiently using matrix computations; nevertheless, there is no requirement for the activation function to be fixed in this way and it can vary between layers and/or neurons within layers. Generally a differentiable activation function (or at least a function that is differentiable over a desired set of input values) is chosen to allow training based on back propagation, in which the loss function is minimized by iteratively computing partial differentials of the loss function with respect to the weights and tuning the weights based on the results.

The bias term $b_{jl}$ for each node (j,l) can be zero or a non-zero value and which can vary between different nodes. The bias term $b_{jl}$ can be fixed or it can be adjusted during training along with the weights.

For the first hidden layer, the inputs are simply the (unweighted) components of the input vector $v_{in}$. By convention, a neural network is often represented as having an input layer that transparently 'relays' the input vector $v_{in}$ to each node of the (first) hidden layer, and the first layer at which processing is actually performed; an equally viable perspective is to think of the input layer as the input vector $v_{in}$ itself; either way, the input layer represents the starting point for the algorithm. This is immaterial but, when it comes to terminology, what is material is that, herein, the first neural network layer at which the input vector $v_{in}$ is processed in accordance with equation (1) (corresponding to the first substantive stage of the algorithm) is referred to as the first hidden layer, or simply the hidden layer if there is only one; that is layer l=1 in the notation introduced above.

Accordingly, the inputs to each node of the (first) hidden layer (l=1) are simply:

$$i_{1,j,i} = x_i \text{ for } j=0, \ldots, D_{in}-1$$

where $x_i$ is the ith component of the input feature vector $v_{in}$ as noted above.

In a simple "feedforward" network, each node (j,l) of each layer l≥1 is connected to each node of the previous layer l−1 (only). This is a viable arrangement in the present context, but alternative arrangements, e.g. which incorporate feedback connections, may also be viable, and for the avoidance of doubt the term neural network is not restricted to a simple feedforward arrangement but encompasses other arrangements too.

For instance, a viable alternate is a convolutional neural network (CNN), and any of the described technology can be implemented with a CNN. CNNs are known per se and have various distinguishing characteristics that are also known per se. A CNN can be trained to perform any of the neural network functions disclosed herein, as will be appreciated.

The first neural network 204A is trained based on training data captured from a group of N training users 512 (user 0 to user N−1). In this example, the dimension of the output layer (l=2) is $D_{out}=N$, i.e. one node per training user such that node (2,n) corresponds to the $n^{th}$ training user.

The training data for each training user is device motion data (recording device motion induced by that user) from which cepstral coefficients are derived, and used to form device motion feature vectors to be inputted to the neural network 204A, in the manner described above.

The device motion feature vectors are inputted at the input layer 502 of the first neural network 204A, in a training phase, and the first neural network 204A is trained by adjusting the weights applied at the hidden and input layers 504, 506 in a systematic way to minimise the loss function $L(f(v_{in}),v_{out})$ until the stopping criteria are met. In this example, the objective function is a "one-hot" categorisation function, i.e. such that:

$$\hat{y}_i = \begin{cases} 1, & i = n \\ 0, & i \neq n \end{cases}$$
$$i = 0, \ldots, N-1$$

for any input vector captured from user n (denoted $v_{in}^n$). That is, $f(v_{in}^n)$ is an N-dimensional vector having all zero components, except for the nth component which is 1. In other words, the neutral network is trained to strictly classify each device motion feature vectors according to which user it has been captured from.

Accordingly, when training is complete, for each of the N training users, any device motion feature vector captured for that user results in an output $o_{2,n} \approx 1$ at the output layer node (2,n) corresponding to that user, and an output $o_{2,j \neq n} \approx 0$ at all other output layer nodes.

In this context, although MSE may be a viable loss function, it is expected that it may be possible to achieve a performance benefit, in some cases, with a cross-entropy error (CEE) loss function. With a one-hot objective function f(*), the cross entropy loss function reduces to:

$$L(f(v_{in}), v_{out}) = -\frac{1}{D_{out}} \sum_i \log(y_i).$$

As indicated, training can be performed using back propagation to reduce the loss function (however it is defined) until the stopping criteria are met. Any suitable backpropagation algorithm can be used, for example gradient descent. Backpropagation and gradient descent are well known per se so further details are not discussed herein.

Regarding the architecture of FIG. 5, it is important to note that there is no requirement for the user who is being authenticated (user 102 in FIG. 1) to be part of the training group 512, and in practice there will be far more end-users than there are training users 512. That is, in general any user being authenticated will not have provided any of the training data used to train the first neural network 204A. This exploits the ability of the first neural network 204A, once trained, to "understand" feature vectors from users it has never encountered before, i.e. the ability of the first neural network 204A to generalize from a narrow set of training data. For users it has not seen before, the output vector $v_{out}$ of the neural network 502A could be seen as a measure of how "similar" the unknown user is to each of the training users. However, it is also important to note that, in the present example, the output vector need not be computed at all and the output layer can be discarded altogether after training, for reasons that will now be explained with reference to FIG. 6.

Figure 6:
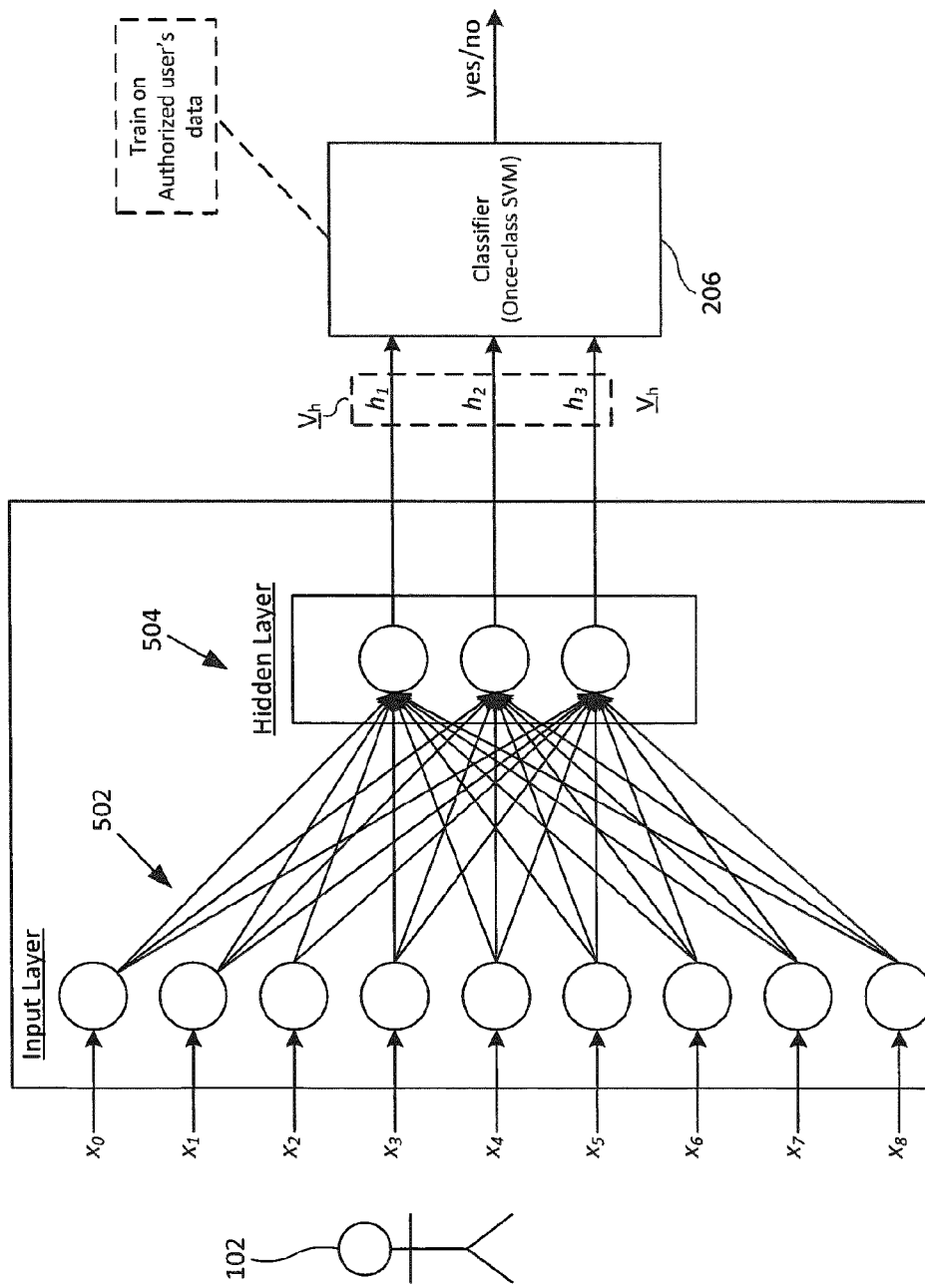
FIG. 6 shows a schematic block diagram of the first neural network when used to authenticate a user.

With reference to FIG. 6, once the first neural network 204A has been trained in this manner, the user 102 is actually classified as authorized/unauthorized, by the classifier 206, using the output of the hidden layer 504, which is a vector $v_h$ of dimension $D_h$ (the dimension of the hidden layer 504, i.e. the number of nodes it contains), which would normally form the input to the output layer 506, and which is denoted:

$$v_h = (h_1, \ldots, h_{D_h-1}) \quad (4)$$

As indicated, preferably $D_h < D_{in}$ which has the effect of dimensionality reduction i.e. reducing the number of vector components that represent the device motion.

The classifier 206 classifies the user 102 as authorized or not authorized based on this output vector $v_{out}$.

The classifier 206 may be a "one-class" classifier. A one-class classifier refers to a classifier that is trained to perform a binary classification (here: authorized/not authorized), using data from a single class only (here: authorized). In other words, a one-class classifier in this context can be trained using only device motion data from a user who is authorized to use the user device 104, without any training data from any other (unauthorized) user. This means that the classifier can recognize a user as unauthorized, even though it has only ever "seen" training data from the authorized user and has never seen training data from an unauthorized user. For example, the classifier 206 may be a one-class support vector machine (SVM).

Alternatively, the classifier 206 can be a binary classifier that is trained using data of other users, who are unauthorised users in this context and then fall into the second class. Where data for a large number of users is available, a selection of the data can be selected for this purpose, at random or using some other suitable selection mechanism.

This classification based on the hidden layer vector output $v_h$ is the means by which it is determined whether or not the unique characteristics of the device motion match those of the expected device motion pattern associated with the authorized user, using information about that device motion captured in the hidden layer vector output $v_h$.

Figure 7:
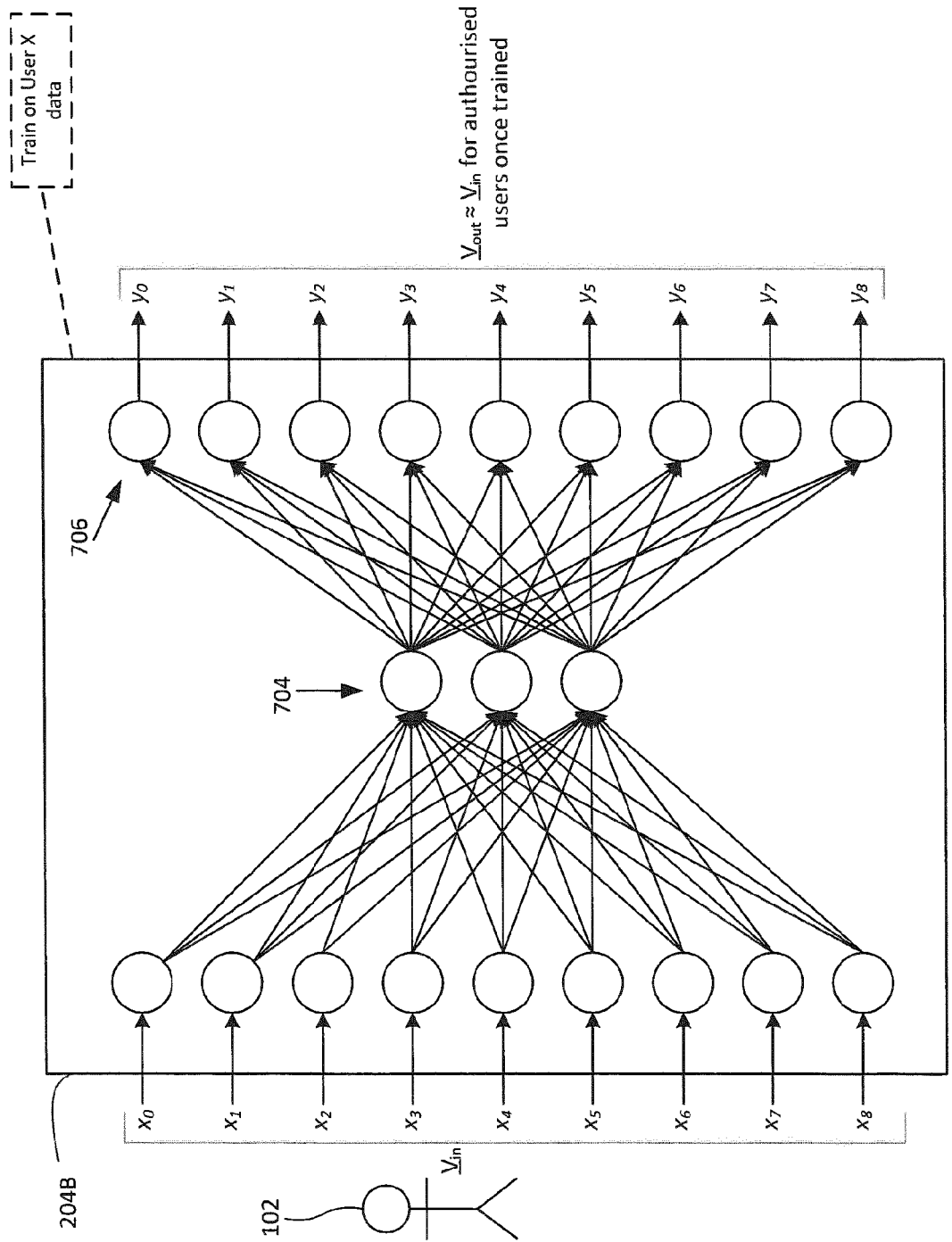
FIG. 7 shows a schematic block diagram of a second neural network for use in authenticating a user.

FIG. 7 shows a second neural network 204B having an alternative architecture. As before, the neural network 204B has an input layer 702, at least one hidden layer 704 and an output layer 706. All of the description above applies equally to the second neural network 204B, but modified as described below.

The underlying training model is quite different in this example. Here, the neural network 204B is trained using training data captured from the authorized user only. That is, a neural network is trained independently for each authorized user.

The objective function is this second example is an identity function:

$$f(v_{in}) = v_{in}$$

That is, a function which simply returns its input as its output for all values. Accordingly, training is performed until the neutral network in able to reproduce each training input vector at the output layer 706, such that $v_{out} \approx v_{in}$.

Once trained, any time the authorized user provides an input vector subsequently, the output of the output layer 706 of the second neural network 204B is expected to approximately match that input vector. However, if some other unauthorized user provides an input vector, the output of the output layer 706 is expected to exhibit a discrepancy from that input vector that is significantly greater than any discrepancy between the authorized user's input and output vectors, i.e. between $v_{in}$ and $v_{out}$. By detecting the presence or absence of such significant discrepancies in the output vector $v_{out}$, it can determined whether or not the user is question is the authorized user. It is the presence of absence of any significant discrepancy that indicates whether or not the device motion matches the expected device motion pattern associated with the authorized user.

Note that, in this example, the full neural network 204B, including the output layer 706, is used once trained as part of the authentication process.

This could be a classification, by a suitably trained classifier 306, e.g. a one-class classifier (e.g. SVM) as in the above, but in this case trained based on the vector output $v_{out}$ of the output layer 706 for the authorized user. The principle here is essentially the same as the first example, in that the classifier is used to classify vectors as matching the authorized user or not using only training data from the authorized. Here, the input to the classifier could simply be $v_{out}$, on the assumption that $v_{out}$ alone is sufficient to convey such discrepancies, or the classifier could receive data of both $v_{out}$ and $v_{in}$ as an input. For example, the input could be $v = v_{out} - v_{in}$ or some function thereof, or some other measure of the difference between $v_{out}$ and $v_{in}$.

An extension of the above techniques will now be described, in which the behavioural biometrics authentication is combined with a form of liveness detection to provide a secure authentication mechanism that is robust to spoofing, whilst minimizing the amount of input needed from a user. This is because the data needed to perform the authentication and the liveness check (device motion data and image data) are captured simultaneously as the user moved the device 104, and the device motion data is used for both authentication and liveness detection. One benefit of the technique is that it can provide biometric authentication in circumstances where it would not be possible to use facial recognition due to the motion of the face in the image data. However the technology is not limited in this respect, and could for example be combined with facial recognition where possible to provide an additional layer of authentication security.

As indicated, the motion-based authentication can be combined with what is referred to herein as "structure based face anti-spoofing", which refers to a set of methods based on the observation that a 2-dimensional still picture of a face is the result of the projection of the 3D face on the 2D image plane. This observation enables a technique to be used where, given as few as two video frame images from different angles of the same face, it is possible to distinguish robustly between a static print attack and genuine input. Additional techniques to solve problems that arise when trying to automate frame selection from a video stream are also described below. A different method is also introduced, appropriate for different types of malicious input, such as replay attacks, to be countered.

Figure 9:
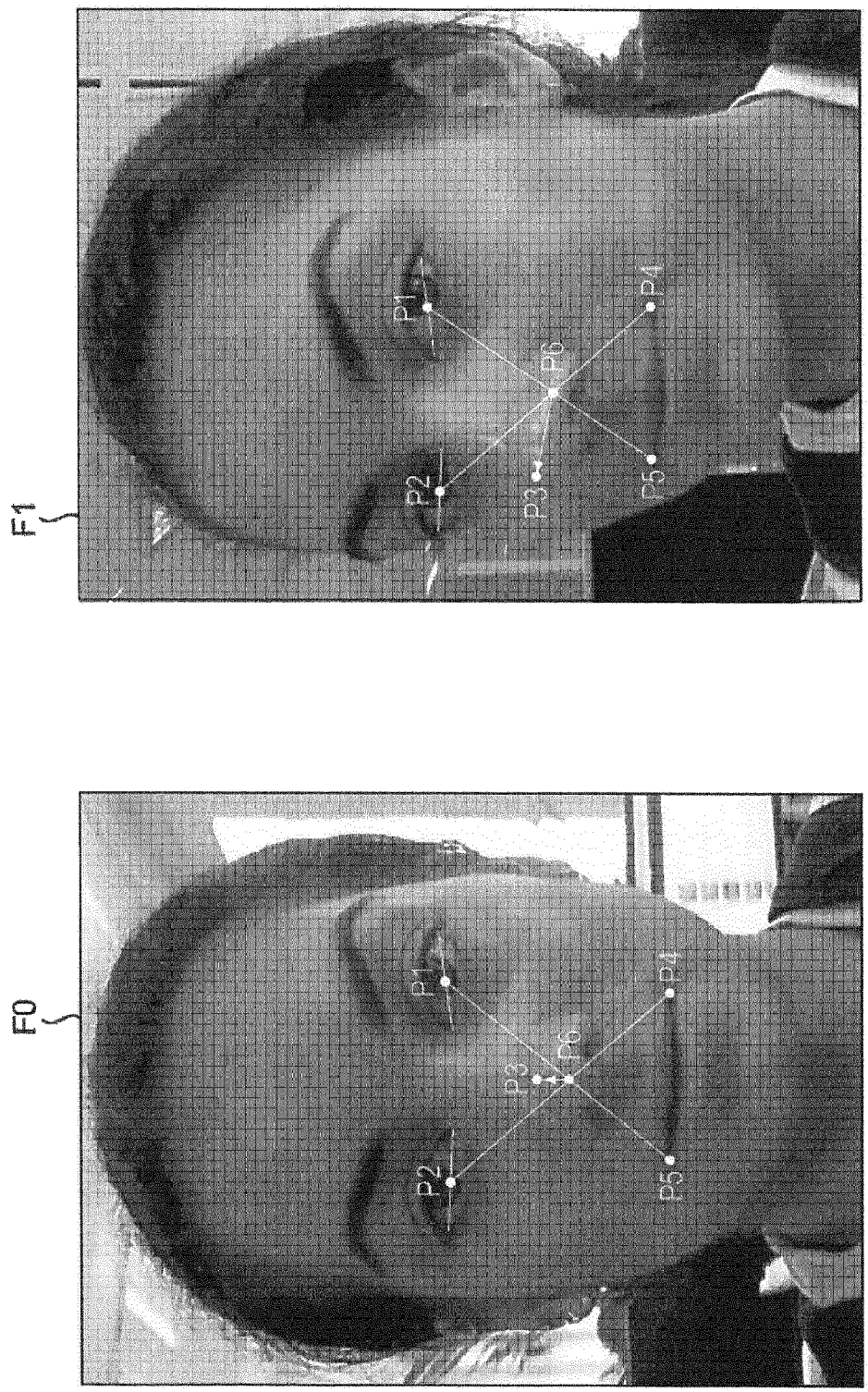

Consider two still pictures of an individual's face where the camera is at a different angle in both frames, for example as shown in FIG. 9. A technique, referred to herein as landmark detection, is used to robustly locate key points on the face. In this section, only the following set of points is exploited:

P1: Left eye centre
P2: Right eye centre
P3: Tip of the nose
P4: Left lip commissure (i.e. left corner of the mouth)
P5: Right lip commissure (i.e. right corner of the mouth)

An additional point P6 is defined, as the intersection between P1P5 and P2P4 (i.e. the line between points P1 to P5 and the line between points P2P4). This point P6 defines the centre of the face.

A distance metric in the form of a displacement vector P=P6P3 ("posture vector"), i.e. a vector separation between points P6 and P3, is determined. Vector P6P3 behaves very differently when drawn upon a static printed picture of a person's face.

Figure 8:
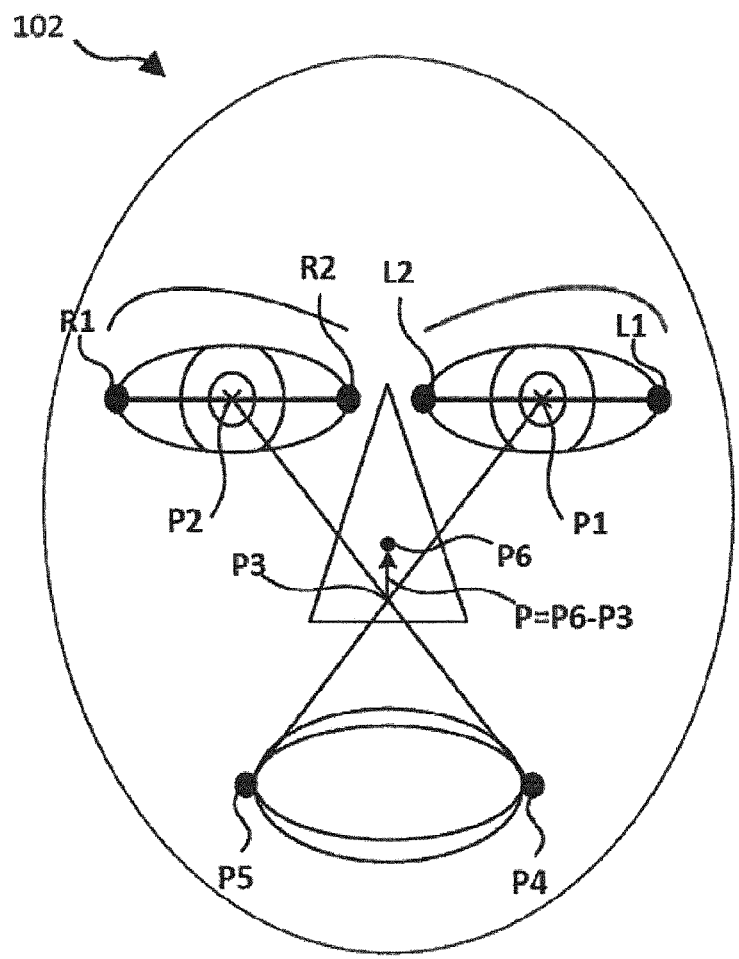
FIGS. 8 and 9 illustrate one example mechanism for detecting the presence of 3D facial structure on a moving image based on facial landmarks.

FIG. 8 illustrates how vectors can be drawn between the various reference points previously discussed. FIG. 9 illustrates these techniques applied to an image of a real face, shown along two different lines of sight in side-by-side images. This allows a vector difference such as the posture vector P to be used to determine whether the captured movement of a face in a moving image is that of a 3-dimensional object or a flat 2-dimensional image of a face. The moving image is capturing user device camera 108.

Reference points on either side of the eyes R1, R2 (right eye) and L1, L2 (left eye) are identified and tracked as the face in the moving image exhibits motion, as are mouth reference points P4 and P5 on either side of the mouth (left and right respectively). Central eye points P1, P2 are determined for each eye as the mid-point between R1 and R2, and L1 and L2 respectively. A point P6 is then determined as the intersection of the line P1-P5 and the line P2-P4. That is, the lines from the approximately centre of each eye to the point lying approximately on the opposite corner of the mouth.

The intersection point P6 lies near to point P3, on the tip of the user's nose. A difference vector, which is the posture vector P=P6P3=P3−P6 (or P6−P3—the choice is immaterial is determined and tracked. As noted, for a moving image of a 3-dimensional human face, i.e a real face, this vector difference P is expected to vary in a certain way as a user moves their head from side-to-side or tilts it up and down. This is because the point P6 corresponds to a point on the nose in 3-dimensional space that is forward of the point I along the user's facing direction. However, if what is captured in the moving image is itself an image of a face, i.e. a 2-dimensional representation of a face on a flat surface, any variations in the difference vector P will be measurable different from those of a 3-dimensional face. Thus, by looking in variations at the difference vector P as the user moves his head or (preferably) his device as the moving image is captured it is possible to distinguish between a real 3-dimensional face and a 2-dimensional facial image. As noted above, this can be natural movement that is not explicitly requested, or the movement may be requested by outputting suitable instructions at the user device 104.

FIG. 9 shows two static images of the same face captured from different angles, which are video frames F0 and F1 respectively. The points P1-P6 are shown in each of the images, and the changes in their relative locations due to the rotation of (in this case) the user's camera is evident.

The posture vector P in frames F0 and F1 is denoted P0 and P1 respectively.

An additional vector S=P0−P1 is determined. A vector norm of the vector S is determined as a score for the inputs. By introducing an empirically calculated threshold T, is possible to determine whether or not the input is genuine, where the entity only passes the test if norm(S)>T. The value norm(S) is a measure of a scalar difference between vectors P0 and P1.

This represents an extremely efficient anti-spoofing test, which can be implemented using as few as two video frames F0, F1 and computationally efficient image processing.

Scale and Rotation Invariance

A problem can arise where, if the face is significantly closer to the camera in one of the frames than the other, a printed static might fool the anti-spoofing detector. For this purpose, a concept of scale invariance is introduced.

To implement scale invariance, a respective distance between the centres of the eyes is determined for each of the frames F0, F1, and applied to the posture vector of that frame as a scale factor. That is, the posture vector for that frame P is scaled by that factor to generate a new vector P' for that frame that is insensitive to the distance between the subject and the camera:

$$P'=P/|P1P2|$$

So for frames F0 and F1 respectively, P0 and P1 are scaled by the distance between the eyes in that frame respectively.

Another problem that can arise is when the input is static printed picture where the subject has his head turned to the side by ~30 degrees. Then an attacker could fool the anti-spoofing system by rotating the printed picture by 90 degrees between the two frames and get a score S greater than the threshold T. To address this, rotation invariance is introduced, where an angle of the line (P1P2) relative to a horizontal direction of the image is measured and the posture vector P is rotated by that angle:

$$P'=\text{rotate}(\text{angle}(P1P2),P)$$

The points P1, P2 at the respective centres of the eyes are suitable reference points to provide both the scalar and rotational invariance because, although they may move as the user moves his head, their positions on the face are fixed (unlike, say, points P4 and P5 on the mouth corners, whose positions on the face may vary due to facial expressions). Other such points on the face (i.e. at fixed locations on the face) can also be used.

Orientation Normalisation

It might also be the case that if the angle between the two frames is too high then even a static printed input might get a score S large enough to pass the anti-spoofing test.

This problem can be solved by normalizing depending on the actual change in the orientation angle between the two frames before thresholding.

This requires an estimation of the orientation/posture of the user's face in some way, for example as described in the next section.

Frame Selection Based on 3D Face Pose Estimation

If the two frames F0, F1 are selected from a continuous input stream derived from a single camera, one of the main problems that arises is how to select the appropriate frames.

This is important since if the orientation change between the two selected frames is too small then all the inputs will be incorrectly classified as attacks instead of genuine faces. A robust pose estimation method allows an appropriate pair of frames to be selected.

3D Face Pose Estimation

To estimate the 3D face posture from a single 2D image (video frame) a generic 3D face shape model is used as a reference. Using this 3D reference shape model, a projection matrix that was used to capture the 2D image is estimated, by seeking the 2D-3D correspondences between the same landmark points in the 2D image and on the surface of the 3D face model.

The 3D to 2D projection matrix, once determined, is exploited in order to compute the Euler angles that specify the 3D face pose on every video frame in terms of its roll, pitch and yaw angles. Euler angles are a known mathematical construct, which are also used to describe the orientation of one frame of reference relative to another e.g. as a triplet of angular values (such as pitch, roll and yaw).

Having obtained the 3D face pose on every video frame, two 2D images are selected as having an orientation change significant enough to facilitate the two-frame structure antispoofing method. That is, the two frames that are selected are such that a difference between the respective orientations of the face in those frames exceeds a suitably threshold chosen to match the parameters of the test itself.

Continuity of Input

A potential attack against the anti-spoofing system might be to have two separate static photos of the same person from two different angles and substitute one for the other during video capture.

This can be prevented by introducing additional checks in the image processing, namely to make sure that the face-detection box position and landmarks are typical of a single object moving at reasonable speeds throughout the input. This means that the face can never be occluded, there can never be more than a single face at a time and it cannot "teleport" from one point to another during the input feed. To this end, a speed measure (e.g. scalar speed or velocity vector) can be determined for the face across the video frames F, and compared with a speed threshold. The entity fails the test if the speed threshold is exceeded at any time.

Extension to Replay Attacks

So far, a relatively cheap and simple attack whereby the attacker displays a video of a live subject from a device/screen in front of the camera has not been addressed.

To address this type of attack, an additional requirement can be introduced, namely that the user's head remains almost still while he is capturing his face from different view angles as he is moving the hand held camera 108. That is, the user is required to rotate the camera 108 whilst keeping his head still.

Thus it is possible to discriminate between a genuine login attempt and a replay attack by measuring a correlation between the face pose change (that is, changes in the posture vector P) in time relative to the way the device is moving in the actual world by the user. In order to estimate the device location and orientation in the real world, available inertial sensor(s) 126 on the user device 104 are exploited. The vast majority of modern mobile devices are equipped with such sensors (e.g. an accelerometer, gyroscope and magnetometer).

Advantageously, the same motion data 201 that is used to authenticate the user 102 can be used to detect reply attacks in this context.

The 3D face pose is estimated on every frame by the method described above. Thus it is possible to practically transform the problem of liveness detection against replay attacks as a time series similarity measurement problem where it is determined whether the input video stream shows a genuine login attempt (live face) if the similarity score is higher than an experimentally defined threshold.

Finally, in order to ensure that the change in the face pose is caused by the displacement of the capture device 108 and not due to head movement, a variance of the respective sensor data is determined, and a requirement can be introduced that the determined variance is above a specified threshold for the entity to pass the test.

As will be appreciated, this is just one example and there are various ways in which the device motion data 201 can be used, both to authenticate the user 102 and to verify that the observed motion in a captured video correlates with the sensed device motion sufficiently.

Although specific embodiments of the inventions have been described, variants of the described embodiments will be apparent. The scope is not defined by the described embodiments but only by the accompanying claims.

The invention claimed is:

1. One or more non-transitory computer-readable media comprising computer-readable instructions to authenticate a user of a hand-held user device, wherein the computer-readable instructions, when executed on one or more hardware processors, cause the one or more hardware processors to implement operations comprising:
   outputting at the hand-held user device instructions requesting the user to induce motion of the hand-held user device for authenticating the user;
   receiving motion data captured using a motion sensor of the hand-held user device during an interval of motion of the user device induced by the user whilst holding the hand-held user device;
   processing the motion data to generate a device motion feature vector;
   receiving image data captured using an image capture device of the user device during a time of the user-induced device motion;
   inputting the device motion feature vector to a neural network, the neural network having been trained to distinguish between device motion feature vectors captured from different users; and
   authenticating the user of the user device by using a resulting vector output of the neural network to determine whether the user-induced device motion matches an expected device motion pattern uniquely associated with an authorized user, the neural network having been trained based on device motion feature vectors captured from a group of training users, which does not include the authorized user;

wherein authenticating the user of the user device comprises analyzing the image data to determine whether three-dimensional facial structure is present therein; and wherein the motion data comprises a time series of device motion values, and wherein authenticating the user of the user device comprises comparing the image data with at least some of the device motion values, to verify that movement of the three-dimensional facial structure, if present, corresponds to the user-induced device motion.

2. The one or more non-transitory computer-readable media of claim 1, wherein authenticating the user comprises classifying, by a classifier, the vector output of the neutral network as matching or not matching the expected device motion pattern.

3. The one or more non-transitory computer-readable media of claim 2, wherein the classifier has been trained for classifying the vector output of the neural network based on one or more earlier device motion feature vectors captured from the authorized user and corresponding to the expected device motion pattern.

4. The one or more non-transitory computer-readable media of claim 3, wherein the classifier is a one-class classifier trained without using any data captured from any unauthorized user.

5. The one or more non-transitory computer-readable media of claim 3, wherein the classifier is a binary classifier trained using one or more earlier device motion feature vectors captured from at least one unauthorized user.

6. The one or more non-transitory computer-readable media of claim 3, wherein the classifier is a support vector machine (SVM).

7. The one or more non-transitory computer-readable media of claim 1, wherein the computer-readable instructions, when executed, further cause the one or more hardware processors to, when the user-induced device motion is determined to match the expected device motion pattern, grant the user of the user device access to at least one of: a function of the user device, a service, and data to which the authorized user is permitted access.

8. The one or more non-transitory computer-readable media of claim 1, wherein the vector output is an output of a hidden layer of the neural network.

9. The one or more non-transitory computer-readable media of claim 1, wherein the neural network is a convolutional neural network (CNN).

10. The one or more non-transitory computer-readable media of claim 1, wherein the device motion feature vector comprises temporal motion values of or derived from the motion data.

11. The one or more non-transitory computer-readable media of claim 1, wherein the motion data comprises a time series of device motion values, and the operations further comprise applying a domain transform to at least a portion of the time series to determine at least one device motion spectrum in the frequency domain, wherein the device motion feature vector comprises coefficients of the said at least one device motion spectrum or values derived from coefficients of the said at least one device motion spectrum.

12. The one or more non-transitory computer-readable media of claim 11 wherein the device motion feature vector comprises logarithmic values and/or cepstral coefficients determined from the device motion spectrum.

13. The one or more non-transitory computer-readable media of claim 12, wherein multiple device motion spectra are determined, each by applying a domain transform to a respective portion of the time series of device motion values, and analyzed to determine whether the user-induced motion of the user device matches the expected device motion pattern.

14. One or more non-transitory computer-readable media comprising computer-readable instructions to authenticate a user of a user device, wherein the computer-readable instructions, when executed on one or more hardware processors, cause the one or more hardware processors to implement operations comprising:

receiving motion data captured using a motion sensor of the user device during an interval of motion of the user device induced by the user;

processing the motion data to generate a device motion feature vector;

inputting the device motion feature vector to a neural network, the neural network having been trained to distinguish between device motion feature vectors captured from different users; and authenticating the user of the user device, by using a resulting vector output of the neural network to determine whether the user-induced device motion matches an expected device motion pattern uniquely associated with an authorized user, the neural network having been trained based on device motion feature vectors captured from a group of training users, which does not include the authorized user;

wherein the motion data comprises a time series of device motion values, and the operations comprise applying a domain transform to at least a portion of the time series to determine at least one device motion spectrum in the frequency domain, and wherein the device motion feature vector comprises coefficients of the said at least one device motion spectrum or values derived from coefficients of the said at least one device motion.

15. The one or more non-transitory computer-readable media of claim 14, wherein the user of the device is authenticated based on analysis of the motion data in combination with facial recognition.

16. The one or more non-transitory computer-readable media of claim 14, wherein authenticating the user of the user device further comprises comparing image data with the motion data, to verify that movement of a three-dimensional facial structure, if present within the image data, corresponds to the user-induced device motion.

17. A user authentication system for authenticating a user of a user device, the user authentication system comprising:

an input configured to receive motion data captured using a motion sensor of the user device during an interval of motion of the user device induced by the user; and one or more hardware processors configured to execute computer readable instructions, which, when executed, cause the one or more processors to implement operations comprising:

receiving motion data captured using a motion sensor of the user device during an interval of motion of the user device induced by the user;

processing the motion data to generate a device motion feature vector, inputting the device motion feature vector to a neural network, the neural network having been trained to distinguish between device motion feature vectors captured from different users; and authenticating the user of the user device, by using a resulting vector output of the neural network to determine whether the user-induced device motion matches an expected device motion pattern uniquely associated with an authorized user, the neural network having been trained based on device motion feature vectors captured from a group of training users, which does not include the authorized user;

wherein the motion data comprises a time series of device motion values, and the operations comprise applying a domain transform to at least a portion of the time series to determine at least one device motion spectrum in the frequency domain, wherein the device motion feature vector comprises coefficients of the said at least one device motion spectrum or values derived from coefficients of the said at least one device motion spectrum.

\* \* \* \* \*

UNITED STATES PATENT AND TRADEMARK OFFICE
CERTIFICATE OF CORRECTION

| | |
|---|---|
| PATENT NO. | : 11,625,464 B2 |
| APPLICATION NO. | : 16/907021 |
| DATED | : April 11, 2023 |
| INVENTOR(S) | : Nikitidis et al. |

It is certified that error appears in the above-identified patent and that said Letters Patent is hereby corrected as shown below:

On the Title Page

On Page 2, Column 2, Line 2, item (56) under Other Publications, delete "convulational" and insert --convolutional--.

In the Specification

In Column 5, Line 32, delete "tray" and insert --may--.

In Column 10, Line 8, delete "(FP 1)," and insert --(FFT),--.

In Column 11, Line 52, delete "below" and insert --below). In this--.

In Column 12, Line 39, delete "($y_0$, . . .,y" and insert --($\hat{y}_0$, . . ., $\hat{y}$--.

In Column 13, Line 21, delete "However" and insert --However,--.

In Column 15, Line 45, delete "reduction" and insert --reduction,--.

In Column 17, Line 64, delete "i.e" and insert --i.e.--.

Signed and Sealed this
First Day of August, 2023

Katherine Kelly Vidal
*Director of the United States Patent and Trademark Office*